United States Patent Office 3,788,986
Patented Jan. 29, 1974

3,788,986
PRODUCTION OF NITROGEN- AND PHOSPHORUS-CONTAINING COMPOUNDS
Brian Garner Bennett, Liverpool, and William Samuel Holmes, Wolverhampton, England, assignors to Albright & Wilson Limited, Oldbury, near Birmingham, Warwickshire, England
No Drawing. Filed Sept. 13, 1972, Ser. No. 288,869
Int. Cl. C05b 7/00
U.S. Cl. 252—1                                    10 Claims

ABSTRACT OF THE DISCLOSURE

Nitrogen- and phosphorus-containing compounds, containing in particular amido phosphates, can be prepared by a two stage process from liquid ammonia and solid phosphorus pentoxide. First a dispersion of solid phosphorus pentoxide in liquid ammonia is formed by adding the phosphorus pentoxide to liquid ammonia with agitation so as to keep local temperatures below 100° C. Secondly the reaction is, after completion of the addition of phosphorus pentoxide is complete, allowed to proceed at a temperature in the range 30–100° C. Typically the products have an N:P ratio in the range 2.4 to 2.6:1. They may be employed as animal feed supplements or plant growth regulants or as intermediates in the production of flame retardant chemicals.

The present invention relates to the production of compounds containing both nitrogen and phosphorus atoms by the reaction of phosphorus pentoxide with liquid ammonia.

Previously it has been suggested that it is possible to obtain a diammonium diamido diphosphate having a nitrogen:phosphorus ratio of 2.0 by reacting liquid ammonia with phosphorus pentoxide at room temperature for 5 to 6 weeks. It has also been proposed to condense ammonia gas onto phosphorus pentoxide and then holding the mixture under pressure at temperatures of less than 42° C. for 8 weeks to obtain materials having an N:P ratio of from 2.2 to 2.4, it being stated that higher temperatures result in the production of glasses.

We have now found that we may obtain products having an N:P ratio greater than 2.4 by the reaction of liquid ammonia with phosphorus pentoxide in substantially shorter times than those previously indicated.

This process which accordingly constitutes our invention comprises (1) forming a dispersion of phosphorus pentoxide in liquid ammonia by adding solid phosphorus pentoxide to excess liquid ammonia with agitation under such conditions as to prevent local temperatures exceeding 100° C. (preferably so as not to exceed 80° C.) and then (2) after addition of the phosphorus pentoxide is complete maintaining the reaction mixture at a temperature in the range 30 to 100° C. (preferably below 80° C.) for sufficient time to bring about the desired degree of reaction.

The prevention of local temperatures from rising above the values stated can be attained by a combination of two factors, namely the bulk temperature of the liquid ammonia and the degree of agitation employed. Obviously the lower the bulk temperature the less is the degree of agitation required.

Preferably the process is carried out by adding the desired amount of phosphorus pentoxide to an excess of liquid ammonia at low temperature (i.e. normally below 0° C. preferably below −10° C.) temperatures of the order of −33° C. being suitable, in order to ensure that there is sufficient cooling available to prevent local temperatures from exceeding 100° C. During this addition the liquid ammonia will be agitated to ensure good dispersion of the $P_2O_5$. However, alternative methods of ensuring this may be employed if desired.

If the reaction is carried out in the preferred method described above by adding phosphorus pentoxide to liquid ammonia at low temperatures a weight excess of at least 1.6:1 preferably greater than 3:1 most preferably about 5.0:1 of liquid ammonia over the phosphorus pentoxide should be employed. If an auxiliary cooling method is employed e.g. cooling by submerger pipes containing ammonia, or other refrigerant, or using a diluent which can cool by evaporation, then it may not be necessary to use this degree of excess of ammonia.

In order to obtain satisfactory products we have found that it is desirable that the local temperature attained during the reaction, particularly during the initial addition of phosphorus pentoxide to ammonia should not at any time exceed 100° C. Preferably a local temperature should not be allowed to exceed 80° C. Once the initial release of heat resulting from the exothermic mixing of the reactants has passed the local temperatures throughout the reaction mixture will become more uniform and then approximate to the bulk temperature. Thus in this stage of the process it is possible, and normally desirable, to heat the reaction mixture to a desired temperature. Such a temperature will be above 30° C. and is desirably above 50° C. and is most preferably to the range 70 to 80° C. Normally some agitation of the reaction mixture is employed in this stage, for example the reaction vessel may be rocked or stirred.

The reaction may be carried out in a batch reactor or in a suitable continuous flow reactor providing that this enables the correct conditions of agitation and temperature to be employed at the appropriate stage of the reaction.

We have also found that it may be useful to carry out the reaction in the presence of a small amount of moisture which may act as a catalyst to aid the formation of the desired product under some circumstances.

The reaction will, of course, be carried out under super-atmospheric pressure in order to keep the ammonia liquid at the temperatures employed. The reaction vessel employed therefore should be one capable of withstanding the vapor pressure exerted by liquid ammonia up to these temperatures.

The length of time for which it is desirable to carry out the second stage of the reaction is typically at least 4 hours, a period of from 8 to 24 hours is often suitable.

The product obtained from the reaction is normally one having an N:P ratio greater than 2.4. Those in the range 2.4 to 2.6 being typical. We believe that the product obtained is probably a mixture of amido phosphates of the formulas $(NH_4)HPO_3NH_2$, $(NH_4)PO_2(NH_2)_2$, $$PO(NH_2)_3$$

together with some diammonium phosphate and condensed amido phosphates.

The product mixture containing the amido phosphates is suitable for use in animal feeds and as a plant growth promoter. For example it may be incorporated in small amounts, for example up to 5% by weight of cattle feed or applied to crops either in conjunction with conventional fertilizers or separately. Alternatively, the products may be heated to 100° C. or above to give condensed materials suitable as flame retardants.

The process of the invention is illustrated by the following examples.

20 grams of phosphorus pentoxide were dispersed in 150 mls. of liquid ammonia at −33° C. maintained under pressure. The reaction mixture was then heated and the conditions employed and the nature of the products obtained were as follows:

| | Dispersion method | Catalyst, percent | Reaction time, hrs. | Temperature, °C. | N:P ratio of product |
|---|---|---|---|---|---|
| Example No.: | | | | | |
| 1 | Rocked autoclave | None | 24 | 70 | 2.60 |
| 2 | do | H₂O, 5% | 24 | 70 | 2.47 |
| 3 | do | H₂O, 10% | 24 | 70 | 2.46 |
| 4 | do | H₂O, 30% | 24 | 70 | 2.64 |
| 5 | do | NH₄COOCH₃, 8% | 24 | 70 | 2.53 |
| 6 | do | None | 8 | 70 | 2.69 |
| 7 | do | do | 8 | 70 | 2.60 |
| COMPARATIVE EXPERIMENTS | | | | | |
| Experiment: | | | | | |
| 1 | Slow agitator | None | 3 | −33 | 1.43 |
| 2 | do | 1% | 3 | −33 | 1.70 |
| 3 | Slow agitator | 2½% | 3 | −33 | 1.77 |
| 4 | do | NH₄Cl, 20% | 3 | −33 | 1.78 |
| 5 | do | Mg(NO₃)₂ 6H₂O, 1% | 3 | −33 | 1.42 |
| 6 | Vigorous agitator | None | 3 | −33 | 1.86 |
| 7 | do | do | 3 | −33 | 1.88 |
| 8 | Rocked autoclave | do | 12 | 120 | 1.2 |
| 9 | do | do | 24 | 120 | 1.8 |
| 10 | do | do | 24 | 120 | 2.1 |

The composition of a typical product of the reaction having an N:P ratio of approximately 2.45:1 was

| | Percent |
|---|---|
| PO(NH₂)₃ | 10.7 |
| NH₄PO₂(NH₂)₂ | 37.4 |
| NH₄PO₃(NH₂) | 7.3 |
| (NH₄)₂HPO₄ | 2.4 |
| Higher phosphates | 42.2 |

We claim:

1. In a process for the production of compounds containing both nitrogen and phosphorus by the reaction of ammonia with phosphorus pentoxide, the improvement which consists in carrying out the process in two stages by
   (1) forming a dispersion of phosphorus pentoxide in liquid ammonia by adding solid phosphorus pentoxide to liquid ammonia in a weight ratio of at least 1.6 parts ammonia to one part phosphorus pentoxide with agitation under such conditions as to prevent local temperatures from exceeding 100° C., and
   (2) after the addition of phosphorus pentoxide is complete, maintaining the reaction mixture in the range 30–100° C.

2. A process according to claim 1 wherein the liquid ammonia is present in a weight ratio of at least 3:1 based on the amount of phosphorus pentoxide employed.

3. A process according to claim 1 wherein the bulk temperature of the liquid ammonia in the first stage is less than −10° C.

4. A process according to claim 3 wherein the bulk temperature of the liquid ammonia is about −33° C.

5. A process according to claim 1 wherein the second stage of the process is carried out at a temperature in the range 70–80° C.

6. A process according to claim 3 wherein the second stage of the process is carried out at a temperature in the range 70–80° C.

7. A process according to claim 2 wherein the first stage of the process is carried out using liquid ammonia at a bulk temperature of about −33° C. and the second stage is carried out at a temperature in the range 70–80° C.

8. A process according to claim 7 wherein the product obtained is subsequently condensed by heating to a temperature of at least 100° C.

9. A process according to claim 1 wherein there is present a catalytic amount of water.

10. A process according to claim 6 wherein there is present a catalytic amount of water.

References Cited

UNITED STATES PATENTS

| 3,226,222 | 12/1965 | Hibbitts et al. | 71—34 X |
| 2,122,122 | 6/1938 | Woodstock | 71—33 X |
| 3,539,328 | 11/1970 | Lewis | 71—34 |
| 2,958,577 | 11/1960 | Arvan | 71—34 X |

SAMIH N. ZAHARNA, Primary Examiner

R. BARNES, Assistant Examiner

U.S. Cl. X.R.

71—32, 34; 99—2 ND; 423—307, 310